United States Patent
Liang et al.

(10) Patent No.: US 11,911,931 B2
(45) Date of Patent: Feb. 27, 2024

(54) ARTICLE INCLUDING A RELEASE LAYER

(71) Applicant: VIAVI SOLUTIONS INC., San Jose, CA (US)

(72) Inventors: Kangning Liang, Santa Rosa, CA (US); Alberto Argoitia, Santa Rosa, CA (US); Jaroslaw Zieba, Santa Rosa, CA (US); Johannes P. Seydel, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 1116 days.

(21) Appl. No.: 16/409,122

(22) Filed: May 10, 2019

(65) Prior Publication Data

US 2020/0353652 A1 Nov. 12, 2020

(51) Int. Cl.
| | |
|---|---|
| *B29C 33/62* | (2006.01) |
| *B29C 41/02* | (2006.01) |
| *B29C 41/42* | (2006.01) |
| *C09D 5/00* | (2006.01) |
| *C09D 129/04* | (2006.01) |
| *C09D 5/20* | (2006.01) |

(52) U.S. Cl.
CPC .............. *B29C 33/62* (2013.01); *B29C 41/02* (2013.01); *B29C 41/42* (2013.01); *C09D 5/00* (2013.01); *C09D 129/04* (2013.01); *C09D 5/008* (2013.01); *C09D 5/20* (2013.01); *Y10T 428/31855* (2015.04)

(58) Field of Classification Search
CPC ......... B29C 33/62; B29C 41/02; B29C 41/42; C09D 5/00; C09D 129/04; C09D 5/008; C09D 5/20; C09D 7/63; Y10T 428/31855; C08K 5/07; C08K 5/092
See application file for complete search history.

(56) References Cited

U.S. PATENT DOCUMENTS

| | | | |
|---|---|---|---|
| 4,347,300 A * | 8/1982 | Shimazu | G03F 3/10 430/167 |
| 8,503,122 B2 | 8/2013 | Liu et al. | |
| 8,709,582 B2 | 4/2014 | Zheng et al. | |
| 8,920,592 B2 | 12/2014 | Suwa et al. | |
| 2014/0113152 A1* | 4/2014 | Zischka | C09D 129/04 427/508 |
| 2014/0121099 A1* | 5/2014 | Taoka | C09D 143/04 427/256 |
| 2017/0368866 A1 | 12/2017 | Seydel et al. | |
| 2019/0196245 A1* | 6/2019 | Ichihara | G02B 5/3083 |

FOREIGN PATENT DOCUMENTS

WO WO-2018043678 A1 * 3/2018 ............... B32B 7/02

OTHER PUBLICATIONS

PubChem "Solubility", National Center for Biotechnology Information (2022). PubChem Compound Summaries. Accessed 2022. https://pubchem.ncbi.nlm.nih.gov (Year: 2022).*

* cited by examiner

*Primary Examiner* — Callie E Shosho
*Assistant Examiner* — Bethany M Miller
(74) *Attorney, Agent, or Firm* — Mannava & Kang, P.C.

(57) ABSTRACT

A multi-layered article including a substrate; a release layer including polyvinyl alcohol and at least one cross-linking agent; and a first selective light modulator layer; wherein the release layer crosslinks and is water insoluble is disclosed. Also, disclosed is a multi-layered article including a substrate; a waterborne release layer; and a first selective light modulator layer including a cross-linking agent. Methods of making the multi-layered articles are also disclosed.

7 Claims, No Drawings

_US 11,911,931 B2_

ARTICLE INCLUDING A RELEASE LAYER

FIELD OF THE INVENTION

The present disclosure generally relates to a multi-layered article including a substrate; a release layer; and a first selective light modulator layer. The release layer can be waterborne. A cross-linking agent can be present in either the release layer or the first selective light modulator layer to cross-link the release layer. The cross-linked release layer can be water-insoluble. Methods of forming multi-layered articles are also disclosed.

BACKGROUND OF THE INVENTION

A solvent-borne layer is formed from a solvent-borne formulation that includes a major portion, i.e., greater than 50% by volume, of organic solvent(s) present in the formulation. Solvent-borne layers can be deposited on a release layer including polyvinyl alcohol because polyvinyl alcohol (PVA) has a strong resistance to organic solvents and a weak adhesion to substrates, such as polyethylene terephthalate (PET). Solvent-borne layers are then released from the substrate by an air or water-stripping process.

However, not all layers are solvent-borne layers, but can be waterborne layers. A waterborne layer resulting from a waterborne formulation that includes a major portion, i.e., greater than 50% by volume, of water present in the formulation. Because PVA is water-soluble, it is not possible to directly deposit a waterborne coating onto a PVA release layer.

SUMMARY OF THE INVENTION

In an aspect, there is disclosed a multi-layered article including a substrate; a release layer including polyvinyl alcohol and a cross-linking agent; and a first selective light modulator layer; wherein the release layer cross-links and is water insoluble.

In another aspect, there is disclosed a multi-layered article including a substrate; a waterborne release layer; and a first selective light modulator layer including a cross-linking agent.

In yet another aspect, there is disclosed a method of forming a multi-layered article including, depositing a waterborne release layer on a substrate; depositing a first selective light modulator layer including a cross-linking agent onto the waterborne release layer, wherein the waterborne release layer cross-links in the presence of the cross-linking agent; and air stripping the first selective light modulator layer from the cross-linked release layer.

In another aspect, there is disclosed a method of forming a multi-layered article including, depositing a waterborne release layer on a substrate; exposing the waterborne release layer to a cross-linking solution including a cross-linking agent, wherein the waterborne release layer cross-links; and depositing a first selective light modulator layer onto the cross-linked release layer.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

It is to be understood that both the foregoing general description and the following detailed description are exemplary and explanatory only, and are intended to provide an explanation of various embodiments of the present teachings. In its broad and varied embodiments, disclosed herein are multi-layered articles including a substrate; a release layer; and a waterborne layer, such as a first selective light modulator layer. The release layer can include polyvinyl alcohol (PVA), which is cross-linked prior to or during, such as simultaneously with, coating of the waterborne layer onto the release layer. The cross-linked PVA becomes water insoluble, i.e., imparts water resistance to the PVA, thereby enabling the PVA to be used as a release layer for the waterborne layer.

The substrate can be any suitable material that can receive deposited layers. The substrate can receive a release layer and deposited layers. The deposited layers can include, but is not limited to, a plurality of selective light modulator layers, such as a first selective light modulator layer; a plurality of reflective layers; a magnetic layer; a plurality of absorber layers; a protective layer; etc.

The substrate for use in the multi-layer article can include a single layer of material. The substrate can be made of a flexible material. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 2 μm to about 100 μm, and as a further example from about 10 to about 50 μm.

The multi-layered article can include a release layer, which can be present on the substrate. The release layer can include a polyvinyl alcohol and/or a cross-linking agent. In an aspect, the release layer is waterborne and, without modification, cannot serve as a release layer to a waterborne layer, such as a first selective light modulator layer. The at least one cross-linking agent can be incorporated into a waterborne release layer including polyvinyl alcohol. The degree of cross-linking of the polyvinyl alcohol present in the release layer can be controlled by the amount of cross-linking agent, temperature and time. The cross-linking agent can include multiple carboxylic acid groups and/or aldehyde groups. Non-limiting examples of a suitable cross-linking agents include glutaraldehyde, polyacrylic acid, maleic acid, oxalic acid, malonic acid, succinic acid, suberic acid, glutaric acid, and adipic acid.

In another aspect, the cross-linking agent can include a radical photoinitiator, such as 2-diazo-1-naphthol-5-sulfonic acid sodium salt. The radical photoinitiator by itself can cross-link polyvinyl alcohol without the need for any cross-linking agent, such as those listed above. The radical photoinitiator can be water-soluble. Non-limiting examples of suitable photoinitiators include benzoin, acetophenone, anthraquinone, benzophenone and naphthophenone. Additional photoinitiators suitable for use in the release layer can include those identified below with regard to the selective light modulator layer.

The release layer including the polyvinyl alcohol, optionally a cross-linking agent, and optionally a photoinitiator can be exposed to an energy source, such as UV light, electron beam, gamma radiation, and/or heat, in order to initiate cross-linking of the polyvinyl alcohol molecules, for example, prior to deposition of a waterborne layer, such as a first selective light modulator layer. The cross-linked release layer can be water resistant and can receive the deposited waterborne layer.

The multi-layered article can include a first selective light modulator layer. If multiple selective light modulator layers (SLML) are present in the multi-layered article, each layer can have the same or different color and/or materials present in each layer. For example, a first selective light modulator layer can be a color red, and a second selective light modulator layer can be blue.

The SLML is a physical layer comprising a plurality of optical functions aiming at modulating (absorbing and or emitting) light intensity in different, selected regions of spectrum of electromagnetic radiation with wavelengths ranging from about 0.2 µm to about 20 µm. The SLML can selectively modulate light by means of absorption provided by a selective light modulator system (SLMS) (discussed in more detail below). In particular, the article can include a SLML that selectively absorbs specific wavelengths of energy, such as light.

A SLML (and/or the materials within the SLML) can selectively modulate light. For example, an SLML can control the amount of transmission in specific wavelengths. In some examples, the SLML can selectively absorb specific wavelengths of energy (e.g., in the visible and/or non-visible ranges). For example, the SLML can be a "colored layer" and/or a "wavelength selective absorbing layer." In some examples, the specific wavelengths absorbed can cause the article to appear a specific color. For example, the SLML can appear red to the human eye (e.g., the SLML can absorb wavelengths of light below approximately 620 nm and thus reflect or transmit wavelengths of energy that appear red). This can be accomplished by adding selective light modulator particles (SLMP) that are colorants (e.g., organic and/or inorganic pigments and/or dyes, such as the phthalocyanine dye) to a host material, such as a dielectric material, including but not limited to a polymer. For example, in some instances, the SLML can be a colored plastic.

In some examples, some or all of the specific wavelengths absorbed can be in the visible range (e.g., the SLML can be absorbing throughout the visible, but transparent in the infrared). The resulting article would appear black, but reflect light in the infrared. In some examples described above, the wavelengths absorbed (and/or the specific visible color) of the article and/or SLML can depend, at least in part, on the thickness of the SLML. Additionally, or alternatively, the wavelengths of energy absorbed by the SLML (and/or the color in which these layers and/or the flake appears) can depend in part on the addition of certain aspects to the SLML. In addition to absorbing certain wavelengths of energy, the SLML can achieve at least one of bolstering a reflector layer against degradation; enabling release from a substrate; enabling sizing; providing some resistance to environmental degradation, such as oxidation of aluminum or other metals and materials used in a reflector layer; and high performance in transmission, reflection, and absorption of light based upon the composition and thickness of the SLML.

In some examples, in addition to or as an alternative to the SLML selectively absorbing specific wavelengths of energy and/or wavelengths of visible light, the SLML of the article can control the refractive index and/or the SLML can include selective light modulator particles (SLMPs) that can control refractive index. SLMPs that can control the refractive index of the SLML can be included with the host material in addition to or as an alternative to an absorption controlling SLMPs (e.g., colorants). In some examples, the host material can be combined with both absorption controlling SLMPs and refractive index SLMPs in the SLML. In some examples, the same SLMP can control both absorption and refractive index.

The performance of the SLML can be determined based upon the selection of materials present in the SLML. In an aspect, the SLML can improve at least one of the following properties: flake handling, corrosion, alignment, and environmental performance of any other layers within article.

The SLML (including each SLML present in an article, if multiple layers are present) can each independently comprise a host material alone, or a host material combined with a selective light modulator system (SLMS). In an aspect, at least one of the first SLML can include a host material. In another aspect, at least one of the first SLML can include a host material and a SLMS. The SLMS can include a selective light modulator molecule (SLMM), a selective light modulator particle (SLMP), an additive, or combinations thereof.

The composition of the SLML can have a solids content ranging from about 0.01% to about 100%, for example from about 0.05% to about 80%, and as a further example from about 1% to about 30%. In some aspects, the solids content can be greater than 3%. In some aspects, the composition of the SLML can have a solids content ranging from about 3% to about 100%, for example from about 4% to 50%.

The host material of the first SLML can independently be a film forming material applied as a coating liquid and serving optical and structural purposes. The host material can be used as a host (matrix) for introducing, if necessary, a guest system, such as the selective light modulator system (SLMS), for providing additional light modulator properties to the article.

The host material can be a dielectric material. Additionally, or alternatively, the host material can be at least one of an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

The first SLML can include from about 0.001% to about 100% by weight of a host material. In an aspect, the host material can be present in the SLML in an amount ranging from about 0.01% to about 95% by weight, for example from about 0.1% to about 90%, and as a further example from about 1% to about 87% by weight of the SLML.

The SLMS, for use in the SLML with the host material, can each independently comprise selective light modulator particles (SLMP), selective light modulator molecules (SLMM), additives, or a combination thereof. The SLMS can also comprise other materials. The SLMS can provide modulation of the amplitude of electromagnetic radiation (by absorption, reflectance, fluorescence etc.) in a selective region or the entire spectral range of interest (0.2 µm to 20 µm).

The first SLML can each independently include in an SLMS a SLMP. The SLMP can be any particle combined with the host material to selectively control light modulation, including, but not limited to color shifting particles, dyes, colorants include colorant includes one or more of dyes (such as the phthalocyanine dye discussed above), pigments, reflective pigments, color shifting pigments, quantum dots, and selective reflectors. Non-limiting examples of a SLMP include: organic pigments, inorganic pigments, quantum dots, nanoparticles (selectively reflecting and/or absorbing), micelles, etc. The nanoparticles can include, but are not limited to organic and metalorganic materials having a high value of refractive index (n>1.6 at wavelength of about 550 nm); metal oxides, such as $TiO_2$, $ZrO_2$, $In_2O_3$, $In_2O_3$—$SnO$, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

Examples of a SLMM include but are not limited to: organic dyes, inorganic dyes, micelles, and other molecular systems containing a chromophore. The SLMM can be a phthalocyanine dye as discussed above.

In some aspects, SLMS of the first SLML can include at least one additive, such as a curing agent, and a coating aid.

The curing agent can be a compound or material that can initiate hardening, vitrification, crosslinking, or polymerizing of the host material. Non-limiting examples of a curing agent include solvents, radical generators (by energy or chemical), acid generators (by energy or chemical), condensation initiators, and acid/base catalysts.

Non-limiting examples of the coating aid include leveling agents, wetting agents, defoamers, adhesion promoters, antioxidants, UV stabilizers, curing inhibition mitigating agents, antifouling agents, corrosion inhibitors, photosensitizers, secondary crosslinkers, and infrared absorbers for enhanced infrared drying. In an aspect, the antioxidant can be present in the composition of the SLML in an amount ranging from about 25 ppm to about 15% by weight.

The first SLML can each independently comprise a solvent. Non-limiting examples of solvents can include acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the solvent can be present in the first SLML in an amount ranging from about 0% to about 99.9%, for example from about 0.005% to about 99%, and as a further example from about 0.05% to about 90% by weight relative to the total weight of the SLML.

In some examples, the first SLML can include a composition having at least one of (i) a photoinitiator, (ii) an oxygen inhibition mitigation composition, (iii) a leveling agent, and (iv) a defoamer.

The oxygen inhibition mitigation composition can be used to mitigate the oxygen inhibition of the free radical material. The molecular oxygen can quench the triplet state of a photoinitiator sensitizer or it can scavenge the free radicals resulting in reduced coating properties and/or uncured liquid surfaces. The oxygen inhibition mitigation composition can reduce the oxygen inhibition or can improve the cure of any SLML.

The oxygen inhibition composition can comprise more than one compound. The oxygen inhibition mitigation composition can comprise at least one acrylate, for example at least one acrylate monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate. The oxygen inhibition mitigation composition can be present in the first SLML in an amount ranging from about 5% to about 95%, for example from about 10% to about 90%, and as a further example from about 15% to about 85% by weight relative to the total weight of the SLML.

In some examples, the host material of the SLML can use a non-radical cure system such as a cationic system. Cationic systems are less susceptible to the mitigation of the oxygen inhibition of the free radical process, and thus may not require an oxygen inhibition mitigation composition. In an example, the use of the monomer 3-ethyl-3-hydroxymethyloxetane does not require an oxygen mitigation composition.

In an aspect, the first SLML can each independently include at least one photoinitiator, such as two photoinitiators, or three photoinitiators. The photoinitiator can be used for shorter wavelengths. The photoinitiator can be active for actinic wavelength. The photoinitiator can be a Type 1 photoinitiator or a Type II photoinitiator. The SLML can include only Type I photoinitiators, only Type II photoinitiators, or a combination of both Type I and Type II photoinitiators. The photoinitiator can be present in the composition of the SLML in an amount ranging from about 0.25% to about 15%, for example from about 0.5% to about 10%, and as a further example from about 1% to about 5% by weight relative to the total weight of the composition of the SLML.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide. The bis acyl phosphine oxide can be a bis (2,4,6-trimethylbenzoyl)phenylphosphineoxide. In an aspect, at least one phosphineoxide can be present in the composition of the SLML. For example, two phosphineoxides can be present in the composition of the SLM.

A sensitizer can be present in the composition of the SLML and can act as a sensitizer for Type 1 and/or a Type II photoinitiators. The sensitizer can also act as a Type II photoinitiator. In an aspect, the sensitizer can be present in the composition of the SLML in an amount ranging from about 0.05% to about 10%, for example from about 0.1% to about 7%, and as a further example from about 1% to about 5% by weight relative to the total weight of the composition of the SLML. The sensitizer can be a thioxanthone, such as 1-chloro-4-propoxythioxanthone.

In an aspect, the SLML can include a leveling agent. The leveling agent can be a polyacrylate. The leveling agent can eliminate cratering of the composition of the SLML. The leveling agent can be present in the composition of the SLML in an amount ranging from about 0.05% to about 10%, for example from about 1% to about 7%, and as a further example from about 2% to about 5% by weight relative to the total weight of the composition of the SLML.

The first SLML can also include a defoamer. The defoamer can reduce surface tension. The defoamer can be a silicone free liquid organic polymer. The defoamer can be present in the composition of the SLML in an amount ranging from about 0.05% to about 5%, for example from about 0.2% to about 4%, and as a further example from about 0.4% to about 3% by weight relative to the total weight of the composition of the SLML.

The first SLML can each independently have a refractive index of greater or less than about 1.5. For example, each SLML can have a refractive index of approximately 1.5. The refractive index of each SLML can be selected to provide a degree of color travel required wherein color travel can be defined as the change in hue angle measured in L*a*b* color space with the viewing angle. In some examples, each SLML can include a refractive index in a range of from about 1.1 to about 3.0, about 1.0 to about 1.3, or about 1.1 to about 1.2. In some examples, the refractive index of each SLML can be less than about 1.5, less than about 1.3, or less than about 1.2. In some examples, SLML can have substantially equal refractive indexes or different refractive indexes one from the other, if more than one SLML is present in the article.

The SLML can have a thickness ranging from about 1 nm to about 10000 nm, about 10 nm to about 1000 nm, about 20 nm to about 500 nm, about 1 nm, to about 100 nm, about 10 nm to about 1000 nm, about 1 nm to about 5000 nm.

A method of forming a multi-layered article can include utilizing a release layer and crosslinking the release layer prior to or during deposition of a waterborne layer, such as the first selective light modulator layer. The method can include depositing a release layer including polyvinyl alcohol and a cross-linking agent on a substrate; cross-linking the polyvinyl alcohol in the release layer, wherein the cross-linked release layer is water insoluble; depositing a first selective light modulator layer on the cross-linked release layer; and air-stripping the first selective light modulator layer from the cross-linked release layer. The cross-linking agent can react with the polyvinyl alcohol at an elevated temperature for a period of time to cross-link the polyvinyl alcohol molecules. In an aspect, an energy source, such as heat and/or light (e.g., UV) can be applied to the deposited release layer to facilitate cross-linking.

The elevated temperature can range from about 40° C. to about 200° C., and from about 60° C. to about 150° C. The period of time can be any period from the beginning of the cross-linking to when there are no polyvinyl alcohol molecules left to cross-link, such as 10 seconds to 24 hours, for example 1 minute to 2 hours.

The first selective light modulator layer can be deposited using a liquid coating process. The liquid coating process can include, but is not limited to: slot-bead, slide bead, slot curtain, slide curtain, in single and multilayer coating, tensioned web slot, gravure, roll coating, and other liquid coating and printing processes that apply a liquid on to a substrate or previously deposited layer to form a liquid layer or film that is subsequently dried and/or cured.

The method can also include depositing a reflector layer onto the deposited first selective light modulator layer. The reflector layer can be deposited using known conventional deposition process, such as physical vapor deposition, chemical vapor deposition, thin-film deposition, atomic layer deposition, etc., including modified techniques such as plasma enhanced and fluidized bed. The reflector layer can be a wideband reflector, e.g., spectral and Lambertian reflector (e.g., white $TiO_2$). The reflector layer can be a metal, non-metal, or metal alloy. In one example, the materials for the reflector layer can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Other reflective materials can also be used in place of aluminum. For example, copper, silver, gold, platinum, palladium, nickel, cobalt, niobium, chromium, tin, and combinations or alloys of these or other metals can be used as material in a single layer of material or a multi-layer article. In an aspect, the material for the reflector layer can be a white or light colored metal. In other examples, the reflector layer can include, but is not limited to, the transition and lanthanide metals and combinations thereof; as well as metal carbides, metal oxides, metal nitrides, metal sulfides, a combination thereof, or mixtures of metals and one or more of these materials.

The thickness of the reflector layer can range from about 5 nm to about 5000 nm, although this range should not be taken as restrictive. For example, the lower thickness limit can be selected so that the reflector layer provides a maximum transmittance of 0.8. Additionally, or alternatively, for a reflector layer including aluminum the optical density (OD) can be from about 0.1 to about 4 at a wavelength of about 550 nm.

The method can also include depositing an additional waterborne layer, such as a second selective light modulator layer, onto the deposited reflector layer. The second selective light modulator layer can be the same or different from the first selective light modulator layer.

The method can include releasing the deposited layers, such as any and all layers deposited on the release layer, from the release layer and the substrate by a mechanical process, such as air stripping or a grinding process. The released layers can be further processed, such as into flakes. To be clear, in addition to the first selective light modulator layer, the deposited layers can include, those discussed previously, such as the plurality of absorber layers, magnetic layer, etc.

In another aspect, a multi-layered article can include a substrate; a waterborne release layer; and a waterborne first selective light modulator layer including a cross-linking agent. The substrate has previously been described. The waterborne release layer can include polyvinyl alcohol.

The first selective light modulator layer can be as described above and can include a cross-linking agent as described above. In an aspect, the cross-linking agent can be water-soluble. In a further aspect, the cross-linking agent can be borax or a borate salt, either of which can rapidly cross-link a polyvinyl alcohol. In particular, when a first selective light modulator layer including borax or a borate salt is deposited onto a non-crosslinked, waterborne release layer including a polyvinyl alcohol, then the borax or borate salt can rapidly (e.g., instantaneously) cross-link the polyvinyl alcohol. Borax can hydrolyze in water, for example, when deposited on a waterborne release layer, to form borate.

A method of forming a multi-layered article can include depositing a waterborne release layer on a substrate; depositing a first selective light modulator layer including a cross-linking agent onto the waterborne release layer, wherein the waterborne release layer cross-links in the presence of the cross-linking agent; and air stripping the first selective light modulator layer from the and/or the substrate. The waterborne release layer is not cross-linked when it is initially deposited on the substrate. The waterborne release layer can include a polyvinyl alcohol.

The deposition of the first selective light modulator layer including the cross-linking agent rapidly crosslinks the polyvinyl alcohol present in the waterborne release layer so that the polyvinyl alcohol does not dissolve into an aqueous phase.

The method can further include depositing additional layers onto the deposited first selective light modulator layer to form deposited layers. The additional layers can include a reflector layer, a second selective light modulator layer, a plurality of absorber layers, etc. The order of additional layers deposited on the deposited first selective light modulator layer can vary depending upon the function of the resultant article.

As discussed above, the first selective light modulator layer, and any additional selective light modulator layers can be deposited using the liquid coating processes disclosed herein. The additional layers, such as the reflector layer, etc., can be deposited using deposition processes.

The method can include air stripping not only the first selective light modulator layer from the cross-linked release layer, but also any additional deposited layers. The method can also include further processing the released, deposited layers, such as a mechanical process including grinding, to produce flakes, sheets, foils, etc.

In a further aspect, there is disclosed a method of forming an article including depositing a waterborne release layer on a substrate; exposing the waterborne release layer to a cross-linking solution including a cross-linking agent, wherein the waterborne release layer crosslinks; and depositing a first selective light modulator layer onto the cross-linked release layer. The waterborne release layer can include polyvinyl alcohol.

The cross-linking solution can include borax and or a borate salt. The cross-linking solution can be deposited onto the waterborne release layer in any manner suitable for such purpose, such as dipping, pouring, spraying, etc. The cross-linking agent can be water-soluble and can rapidly cross-link the polyvinyl alcohol in the waterborne release layer.

After the crosslinking is substantially complete, a waterborne layer, such as a first selective light modulator layer can be deposited onto the crosslinked release layer.

The method can further include depositing additional layers onto the deposited first selective light modulator layer to form deposited layers. The additional layers can include a reflector layer, a second selective light modulator layer, a plurality of absorber layers, etc. The order of additional layers deposited on the deposited first selective light modulator layer can vary depending upon the function of the resultant article.

As discussed above, the first selective light modulator layer, and any additional selective light modulator layers can be deposited using the liquid coating processes disclosed herein. The additional layers, such as the reflector layer, etc., can be deposited using deposition processes.

The method can include air stripping not only the first selective light modulator layer from the cross-linked release layer, but also any additional deposited layers. The method can also include further processing the released, deposited layers, such as a mechanical process including grinding, to produce flakes, sheets, foils, etc.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A multi-layered article, comprising:
   a substrate;
   a release layer including polyvinyl alcohol and a cross-linking agent; and
   a first selective light modulator layer;
   wherein the release layer crosslinks and is water insoluble,
   wherein the cross-linking agent includes a radical photoinitiator.

2. The article of claim 1, wherein the radial photoinitiator is 2-diazo-1-naphthol-5-sulfonic acid sodium salt.

3. A method of forming a multi-layered article, comprising:
   depositing a release layer including polyvinyl alcohol and a cross-linking agent on a substrate, the cross-linking agent including a radical photoinitiator;
   cross-linking the polyvinyl alcohol in the release layer, wherein the cross-linked release layer is water insoluble; and
   depositing a first selective light modulator layer on the cross-linked release layer.

4. The method of claim 3, wherein, in the absence of water, the cross-linking agent reacts with the polyvinyl alcohol at an elevated temperature for a period of time.

5. The method of claim 4, wherein the elevated temperature ranges from about 40° C. to about 150° C.

6. The method of claim 4, wherein the period of time ranges from about 10 seconds to about 24 hours.

7. The method of claim 3, wherein cross-linking the polyvinyl alcohol in the release layer includes applying an ultraviolet light.

\* \* \* \* \*